(12) United States Patent
Cho

(10) Patent No.: US 7,499,485 B2
(45) Date of Patent: Mar. 3, 2009

(54) METHOD AND APPARATUS FOR DETECTING GPS DATA-BIT BOUNDARIES AND DETECTING GPS SATELLITE-SIGNAL RECEPTION

(75) Inventor: Dong-Sik Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 852 days.

(21) Appl. No.: 11/016,596

(22) Filed: Dec. 17, 2004

(65) Prior Publication Data

US 2005/0135463 A1    Jun. 23, 2005

(30) Foreign Application Priority Data

Dec. 19, 2003    (KR) .................. 10-2003-0093550

(51) Int. Cl.
*H04B 1/00* (2006.01)

(52) U.S. Cl. .................. 375/150; 375/142; 375/343

(58) Field of Classification Search ......... 375/140–142, 375/147, 150, 343
See application file for complete search history.

(56) References Cited

U.S. PATENT DOCUMENTS 4,426,712 A * 1/1984 Gorski-Popiel ............. 375/343

6,496,145 B2    12/2002    Gronemeyer
6,512,479 B1    1/2003    Sahai et al.
2002/0159542 A1    10/2002    Kokkonen et al.
2003/0151547 A1    8/2003    Mauro et al.

\* cited by examiner

*Primary Examiner*—David B Lugo
(74) *Attorney, Agent, or Firm*—F. Chau & Associates, LLC

(57) ABSTRACT

Method and apparatus for detecting 50 Hz GPS data-bit boundaries and detecting satellite-signal reception. The apparatus includes a correlating unit and a data-bit boundary detecting unit. The correlating unit outputs first (I) correlation integral values and second (Q) correlation integral values sequentially by calculating a correlation integrals between a satellite pulse train and a replica PN code. The data-bit boundary detecting unit changes the sign of each of the first (I) correlation integral values and second (Q) correlation integral values, based on comparing each of the first and second correlation integral values with an immediately previously outputted (first or second, respectively) correlation integral value, and generates data-bit boundary detection signals having information corresponding to the data-bit boundary using the changed correlation integral values. Thus, the data-bit boundary in GPS satellite signals can be detected.

25 Claims, 14 Drawing Sheets

FIG. 6A

| | I | Q | I' | Q' | I' + Q' | VARIATION VALUE | I" | Q" |
|---|---|---|---|---|---|---|---|---|
| 1 | 904 | 210 | 904 | 210 | 1114 | 0 | 904 | 210 |
| 2 | -920 | 29 | -920 | 29 | -891 | 1 | 920 | -29 |
| 3 | -297 | 671 | 279 | 671 | 950 | 0 | 279 | -671 |
| 4 | 378 | 216 | -378 | 216 | -162 | 1 | -378 | -216 |
| 5 | 419 | -7 | 419 | -7 | 412 | 0 | -419 | 7 |
| 6 | -935 | -279 | -935 | 279 | -656 | 1 | 935 | 279 |
| 7 | -175 | 988 | 175 | -988 | -813 | 1 | 175 | -988 |
| 8 | -805 | -154 | 805 | -154 | 651 | 0 | 805 | 154 |
| 9 | 1309 | -1334 | -1309 | 1334 | 25 | 0 | -1309 | 1334 |
| 10 | 582 | 403 | 582 | -403 | 179 | 0 | -582 | -403 |
| 11 | 399 | -422 | 399 | -422 | -23 | 1 | -399 | 422 |
| 12 | -855 | -1104 | -855 | 1104 | 249 | 0 | 855 | 1104 |
| 13 | 940 | -84 | -940 | 84 | -856 | 1 | -940 | 84 |
| 14 | 15 | -1139 | 15 | 1139 | 1154 | 0 | -15 | 1139 |
| 15 | 1122 | 125 | 1122 | -125 | 997 | 0 | -1122 | -125 |
| 16 | 1329 | -1067 | 1329 | -1067 | 262 | 0 | -1329 | 1067 |
| SUM | 3428 | -2948 | | | | | -1620 | 3368 |

FIG. 6B

| | I | Q | I' | Q' | I' + Q' | VARIATION VALUE | I" | Q" |
|---|---|---|---|---|---|---|---|---|
| 1 | -1506 | 7132 | 1506 | 7132 | 8683 | 0 | -1506 | 7132 |
| 2 | 67 | 9346 | -67 | 9346 | 9279 | 0 | 67 | 9346 |
| 3 | 696 | 9052 | 696 | 9052 | 9748 | 0 | 696 | 9052 |
| 4 | -114 | 8844 | -114 | 8844 | 8730 | 0 | -114 | 8844 |
| 5 | 2521 | 9287 | -2521 | 9287 | 6766 | 0 | 2521 | 9287 |
| 6 | 1749 | 7809 | 1749 | 7809 | 9558 | 0 | 1749 | 7809 |
| 7 | 1044 | 8743 | 1044 | 8743 | 9787 | 0 | 1044 | 8743 |
| 8 | 1054 | 5295 | 1054 | 5295 | 6349 | 0 | 1054 | 5295 |
| 9 | -2438 | -8136 | -2438 | -8136 | -10574 | 1 | 2438 | 8136 |
| 10 | -4269 | -8356 | 4269 | 8356 | 12625 | 0 | 4269 | 8356 |
| 11 | -4005 | -8537 | 4005 | 8537 | 12542 | 0 | 4005 | 8537 |
| 12 | -3477 | -7770 | 3477 | 7770 | 11247 | 0 | 3477 | 7770 |
| 13 | -5355 | -6667 | 5355 | 6667 | 12022 | 0 | 5355 | 6667 |
| 14 | -5082 | -7841 | 5082 | 7841 | 12923 | 0 | 5082 | 7841 |
| 15 | -4207 | -8109 | 4207 | 8109 | 12316 | 0 | 4207 | 8109 |
| 16 | -4409 | -6653 | 4409 | 6653 | 11062 | 0 | 4409 | 6653 |
| SUM | -27731 | 3439 | | | | | 38753 | 127577 |

METHOD AND APPARATUS FOR DETECTING GPS DATA-BIT BOUNDARIES AND DETECTING GPS SATELLITE-SIGNAL RECEPTION

CROSS REFERENCE TO RELATED APPLICATION

This application claims priority under 35 USC § 119 to Korean Patent Application 2003-93550 filed on Dec. 19, 2003, the contents of which are herein incorporated by reference in its entirety for all purposes.

BACKGROUND OF THE INVENTION

1. Field of the Invention

The present invention relates to global positioning satellite (GPS) signal reception, and more particularly to a method and an apparatus for detecting a data-bit boundary to discriminate whether a satellite signal is received.

2. Description of the Related Art

A satellite signal transmitted from a satellite to a GPS receiver includes a satellite pulse train, which is the product of a satellite data stream and a Pseudo-Noise (PN) Code. GPS receivers calculate the range from the receiver to a satellite. Once the range to a satellite is known, the receiver knows it lies somewhere on a sphere of radius equal to this range. If the range to a second satellite is found, a second sphere can be drawn around that satellite (diagram). The receiver now knows that it lies somewhere on the circle where the two spheres intersect. With a third satellite, the location can be reduced to two points. To calculate the range from the receiver to the satellite, two things are needed: time and speed. The satellites send out a continuous radio signal, picked up by the receiver which multiplies the speed of the signal, (the speed of light) by the time it took the signal to travel from the satellite to the receiver. All GPS satellites have several atomic clocks. The signal that is sent out includes a random sequence called pseudo-random (PRN) or Pseudo-Noise (PN) code. This pseudo-random sequence is repeated continuously. All GPS receivers know this sequence and repeat it internally (as a replica PN code). The receiver picks up the satellite's transmission and compares the incoming signal to its own internal signal. By comparing how much the satellite signal is lagging, the travel time becomes known. Along with the pseudo-random Pseudo-Noise (PN) code, the satellite also transmits a "navigation message" data stream containing its exact orbital characteristics. The receiver on the ground takes this information and uses it to plot the satellite's location. The unique navigational data signal each GPS satellite transmits is a centered on two L-band frequencies of the electromagnetic spectrum. The navigation message contains the satellite orbit information, satellite clock parameters, and pertinent general system information necessary for real-time navigation to be performed. The navigation message generally must be decoded before the receiver starts the tracking cycle for real-time positioning (note that the message only changes once an hour).

The satellite data stream includes data-bits and thus a data-bit boundary (boundaries). Since there is initially uncertainty about the bit boundaries in the transmitted data bits in a GPS navigation message, this uncertainty must be removed in order to be able to detect navigation data bits. If receiver position and time is roughly known, these can be used for bit synchronization, otherwise bit boundaries have to be detected.

Traditionally GPS receivers have been designed with separate acquisition and tracking modes. To compute a position, the device must first acquire the satellite signals, and to do this it generally must search over all possible frequency and code-delay bins. The GPS receiver detects the signal by correlating (coherent integration). That is, multiplying the received signal with a locally generated replica of the PN code used in the satellite, and then integrating (or low-pass filtering) the product to obtain a peak correlation signal. The peak of this signal vanishes when the locally generated code-delay is wrong, or when the frequency is wrong. The GPS receiver correlates the incoming (received) signal with versions of the locally generated (replica) PN code shifted by different phase amounts. Thus, to acquire the signal, a GPS receiver must search the entire space of possible frequency offsets and code delays. The search is conducted over ranges of frequency and code-delay, which we call bins.

The L1 carrier is modulated with a 10.23 MHz precise (P-code) ranging signal and a 1.023 MHz clear acquisition (or coarse/acquisition, C/A code) ranging signal. These are pseudo random noise (PRN) (PN) codes in phase quadrature. The L2 signal is modulated with the P-code only. Both the L1 and L2 signals are also continuously modulated with a data stream at 50 bits per second. Access to GPS by civilian users is provided through the C/A coded signals. The C/A code is modulated by a PRN Gold code of 1023 chips, at a chipping rate of 1.023 MHz, resulting in a null-to-null bandwidth of 2.046 MHz and a repetition rate of 1 millisecond. Each satellite has its own unique C/A code that provides satellite identification for acquisition and tracking by the user.

The navigation message consists of a 50 bit per second data stream containing information enabling the receiver to perform the computations required for successful navigation and is repeated every 30 seconds. Because the data rate is 50 bits/second, each bit lasts for 20 milliseconds. If these bits are not known, then a coherent average accumulated before the bit boundary may have a different sign then the average accumulated after the bit boundary. In a conventional satellite-signal reception discriminating apparatus, the position of a satellite must be detected by separately receiving information corresponding to the data-bit boundaries because the data-bit boundary cannot be detected in a correlation integration process. Also, in another conventional satellite-signal reception discriminating apparatus, in order to detect the position of the satellite, a correlation integration by parts of the satellite pulse trains and a replica PN code is performed and the square of the resulting integration values is computed. This method is known as a noncoherent integration process. Then, the conventional satellite-signal reception discriminating apparatus detects the position of the satellite using the squared value. However, in case where the noncoherent integration process is performed, the noise also contained in the satellite signal becomes larger as the satellite signal becomes larger. Therefore, the efficiency thereof is decreased. The conventional satellite-signal reception discriminating apparatus performs a coherent integration process to eliminate the noise. However, in the conventional satellite-signal reception discriminating apparatus, where the coherent integration process is employed, the process of the correlation integral by parts is performed without the square of the resulting integration values. Subsequently, the conventional satellite-signal reception discriminating apparatus cannot detect the data-bit boundary in the coherent process. As a result, the conventional satellite-signal reception discriminating apparatus determines that the satellite signal is not being received even though the satellite signal is being received from a desired satellite. Therefore, there is a need for an apparatus that can detect the data-bit boundary and discriminate the satellite signal corresponding to the data-bit boundary.

SUMMARY OF THE INVENTION

Aspects of the present invention provide a method and an apparatus for detecting a data-bit boundary and for discriminating satellite-signal reception, which detect the data-bit boundary in a coherent integration and detect whether a satellite signal including a data-bit boundary is received when the satellite pulse trains includes the data-bit boundary.

In some exemplary embodiments, a data-bit boundary detecting method includes: (a) calculating a correlation integral between a satellite pulse train and a replica PN code on a predetermined unit basis to output sequentially M first correlation integral values and M second correlation integral values, the satellite pulse train being a product of a satellite data stream and a Pseudo-Noise (PN) code sequence contained in a satellite signal, where M is an integer grater than 2; (b) comparing K-th first correlation integral value with an K-1-th first correlation integral value to change an K-th first correlation integral value, where K is an integer in a range from 2 to M; (c) comparing the K-th second correlation integral value with an K-1-th second correlation integer value to change an K-th second correlation integer value; (d) calculating a sum of the changed K-th first correlation integral value and the changed K-th second correlation integral value; (e) generating a K-th variation value according to the calculated sum; repeating steps (b) through (e) while K is sequentially incremented from 2 to M; and detecting the data-bit boundary based on the variation values. The K-th variation value may be 0 when the sum of the K-th first correlation integral value and the K-th second correlation integral value is a positive number.

The variation value corresponding to the K may be 1 when the sum of the K-th first correlation integral value and the K-th second correlation integral value is a negative number.

In another exemplary embodiment, a data-bit boundary detecting method includes (a) calculating a correlation integral between a satellite pulse train and a replica PN code on a predetermined unit basis to output sequentially M first correlation integral values and M second correlation integral values, the satellite pulse train being a product of a satellite data stream and a Pseudo-Noise (PN) code sequence contained in a satellite signal, where M is an integer greater than 2; (b) comparing an K-th first correlation integer value with an K-1-th first correlation integer value to change a K-th first correlation integer value, where N is an integer in a range from 2 to M; (c) comparing an K-th second correlation integer value with an K-1-th second correlation integer value to change an K-th second correlation integer value; (d) calculating a sum of the changed K-th first correlation integral value and the changed K-th second correlation integral value; (e) generating a K-th variation value according to the calculated sum; (f) repeating steps (b) through (e) while K is sequentially incremented from 2 to M; and (g) changing the M first correlation integral values and the M second correlation integral values according to the generated variation values; (h) combining the changed M first correlation integral values and the changed M second correlation integral values to output a combination value; and (i) comparing the combination value with a predetermined threshold value to output a reception discriminating signal having information indicating whether or nor the desired satellite signal is received.

The step (h) may include: integrating the changed M first correlation integral values to output a first integral value; integrating the changed M second correlation integral values to output a second integral value; squaring the first integral value to output a first square value; squaring the second integral value to output a second square value; and summing the first square value and the second square value to output the a combination value.

The step (g) may include changing a K-th first correlation integral value, subsequent first correlation integral values, a K-th second correlation integral value and subsequent second correlation integral values when a variation value having a value of 1 is detected at a K-th variation value for the first time, wherein K is an integer in a range from 2 to M. The data-bit boundary detecting method may further include (j) storing a location information corresponding to the K.

The data-bit boundary detecting method may further include changing the phase of the replica PN code; and repeating the steps (a) through (j) in accordance with the changed phase.

The data-bit boundary detecting method may further include comparing the combination value respectively associated with phases of the replica PN code; extracting a maximum combination value among the combination values; and outputting a phase information corresponding to the maximum combination value.

In still another exemplary embodiment, a data-bit boundary detecting apparatus includes: a correlating unit configured to calculate a correlation integral between a satellite pulse train and a replica PN code sequence, to sequentially output M first correlation integral values and M second correlation integral values, the satellite pulse train contained in a satellite signal being a product of a satellite data stream and a Pseudo-Noise (PN) code sequence, wherein M is an integer greater than 2; a data-bit boundary detecting unit configured to compare the sequentially outputted first correlation integral values with an immediately previously outputted first correlation integral values to change the M first correlation integral values respectively, configured to compare with an immediately previously outputted second correlation integral value to change the M second correlation integral values respectively and configured to by sequentially add the changed M first correlation integral values and the changed M second correlation integral values respectively to generate M data-bit boundary detection signals having information corresponding to the data-bit boundary. The data-bit boundary detecting unit include: a comparing unit configured to compare each of the M first correlation integral values with an immediately previously outputted first correlation integral value, and configured to compare each of the M second correlation integral values with an immediately previously outputted second correlation integral value; a converting unit configured to change the M first correlation integral values and the M second correlation integral values based on the comparison result by the comparing part; and an adding unit configured to sum the changed M first correlation integral values and the changed M first correlation integral values respectively to generate M data-bit boundary detection signals. The comparing unit includes: a first comparator configured to compare each of the M first correlation integral values with an immediately previously outputted first correlation integral value; and a second comparator configured to compare each of the M second correlation integral values with an immediately previously outputted second correlation integral value. The converting unit includes: a first converter configured to change the M first correlation integral values according to the comparison by the first comparator; and a second converter configured to change the M second correlation integral values according to the comparison by the second comparator. In still another exemplary embodiments, a satellite-signal reception discriminating apparatus includes: a correlating unit configured to calculate a correlation integral between a satellite pulse train and a replica PN code sequence on a predetermined unit basis to sequentially output M first correlation integral values and M second correlation integral values, the satellite pulse train being a product of a satellite data stream and a Pseudo-Noise (PN) code sequence contained in a satellite signal, wherein M is an integer greater than 2; a variation value outputting unit configured to output M variation values having information about a data-bit boundary based on the M first correlation integral values and the M second correlation integral values; a converting unit configured to change the M first correlation integral values and the M second correlation integral values according to a corresponding variation value; a combination value generating unit configured to perform the combination of the M changed first correlation integral values and the M changed first correlation integral values to output a satellite-signal reception discriminating value; and a determining-signal generating unit configured to compare the satellite-signal reception discriminating value with a predetermined threshold value to output a reception discriminating signal having information indicating whether or not the satellite signals are received. The variation value outputting unit includes: a comparing unit configured to compare each of the M first correlation integral values with an immediately previously outputted first correlation integral value to change M first correlation integral values and configured to compare each of the M second correlation integral values with an immediately previously outputted second correlation integral value to change M second correlation integral values; an adding unit configured to sum the M first correlation integral values and the M second correlation integral values respectively to output M addition values; and a variation value determining unit configured to output M variation values based on the M addition values.

The comparing unit includes: a first delay element configured to delay the M first correlation integral values by a predetermined amount; a first XOR gate, coupled to the first delay element, configured to receive the M first correlation integral values and the M delayed first correlation integral values; a second delay element configured to delay the M second correlation integral values by a predetermined amount; and a second XOR gate, coupled to the second delay element, configured to perform a logical XOR operation on the M second correlation integral values and the M delayed second correlation integral values. The variation value determining unit includes: a flip-flop configured to receive the M addition values; a first inverter configured to invert the M first correlation integral values; a first multiplexer, coupled to the flip-flop, configured to receive the M first correlation integral values and the M inverted first correlation integral values; a second inverter configured to invert the M second correlation integral values; and a second multiplexer, coupled to the flip-flop, configured to receive the M second correlation integral values and the M inverted second correlation integral values. The combination value generating unit may include: an integrating unit configured to integrate the changed first correlation integral values to output a first integral value and configured to integrate the changed second correlation integral values to output a second integral value; a multiplying unit configured to square the first integral value to output a first square value and configured to square the second integral value to output a second square value; and a summing unit configured to sequentially sum the first square value with the second square value to output satellite-signal reception discriminating value. The converting unit may change signs of a K-th first correlation integral value and subsequent first correlation integral values, and a K-th second correlation integral value and subsequent second correlation integral values, when a value of "1" is detected firstly at a K-th value of the variation values, wherein K is an integer in a range from 2 to M. In still another exemplary embodiments, a satellite-signal reception discriminating apparatus includes: a boundary information managing unit configured to combine a satellite pulse train and N replica PN code sequences to sequentially output N×M first correlation integral values and N×M second correlation integral values, the satellite pulse train being a product of a satellite data stream and a Pseudo-Noise (PN) Code sequence contained in satellite signal, and configured to combine the first correlation integral values and the second correlation integral values to output N×M variation values having information about a data-bit boundary, wherein N and N×M are integers greater than 2; a converting unit configured to change the first correlation integral values and the second correlation values according to the variation values; an integrating unit configured to integrate the changed first correlation integral values by the unit of M to output N first integral values, and configured to integrate the changed second correlation integral values by the unit of M to output N second integral values; a squaring unit configured to square the first integral values respectively outputting N first square values, and configured to square the second integral values to output N second square values respectively; a summing unit configured to sum the first square values with the corresponding second square values respectively to sequentially output N addition values; and a determining-signal generating unit configured to compare the N addition values with a predetermined threshold value respectively to output a reception discriminating signal having an information indicating whether or not the satellite signal is received, and configured to output a phase information corresponding to a maximum addition value in addition values greater than the predetermined threshold value. The satellite-signal reception discriminating apparatus may further include a storing unit configured to discriminate N×M variation values by the unit of M to store a location information of the variation values having a value of "1".

The storing unit may include: a counter configured to count N×M variation values by the unit of M; a location information providing part, coupled to an output of the counter, configured to provide the location information of the variation values having the value of "1"; and a memory configured to store the provided location information.

BRIEF DESCRIPTION OF THE DRAWINGS

The above and other features of the present invention will become better understood by describing in detail some exemplary embodiments thereof with reference to the accompanying drawings, in which:

FIG. 6A is a diagram showing a combination table of satellite data stream contained in undesired satellite signals and 16 phases of the replica PN code;

FIG. 6B is a diagram showing a combination table of satellite data stream contained in desired satellite signals and the 16 phases of the replica PN code;

DETAILED DESCRIPTION OF THE EXEMPLARY EMBODIMENTS

Figure 1:
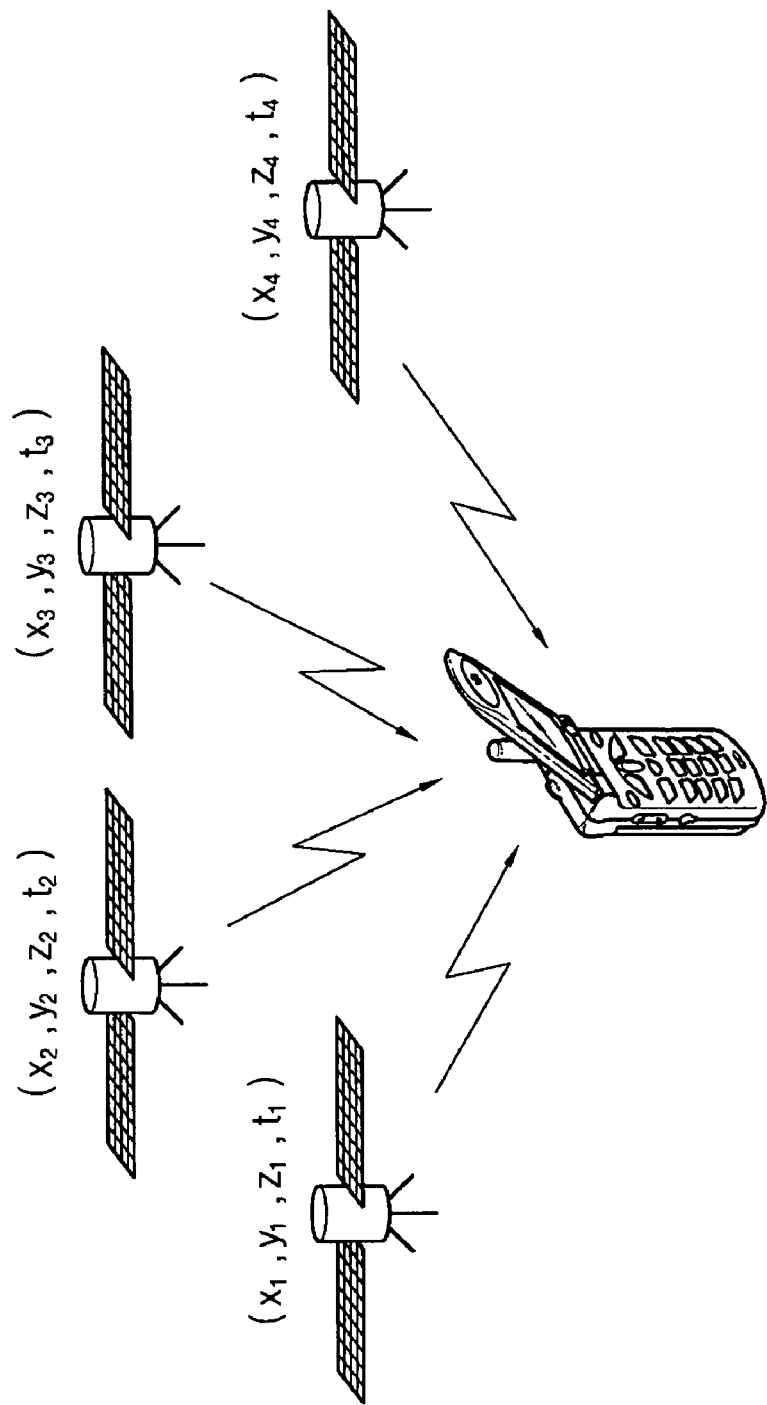
FIG. 1 is a schematic diagram showing an example of a global positioning system (GPS) for determining the position of a GPS terminal.

FIG. 1 is a schematic diagram showing an example of a global positioning system (GPS) for determining the position of a GPS terminal.

Referring to FIG. 1, position information of at least 3 satellites of approximately 30 satellites is needed for determining the position of a GPS receiver. However, the position information of another satellite is required because the times set for the GPS receiver and the satellites are different from each other. Ultimately, the positions of at least four satellites are required for the position detection of the GPS receiver.

The position of the satellites can be tracked when the PN codes and delay times of signals transmitted from the satellites are given. The satellite signals are transmitted from the satellites to the GPS receiver at the speed of light. However, the GPS receiver can receive the satellite signals at a frequency different from a predetermined frequency due to a Doppler effect. Therefore, the GPS receiver requires the delay time, the PN codes and the frequencies of satellite signals in order to detect the position of the satellites.

The GPS receiver receives a plurality of satellite signals from the satellites and then detects the satellite signal transmitted from a desired satellite. Specifically, the GPS receiver obtains comparison values by comparing a replica PN code sequence corresponding to satellite signal transmitted from the desired satellite with the satellite signals. As a result, the comparison value is not less than a predetermined threshold value if the GPS receiver receives satellite signal from the desired satellite. On the other hand, the comparison value is less than a predetermined threshold value if the GPS receiver receives satellite signal from any satellite other than the desired satellite. The GPS receiver can track positions of 4 satellites by using aforementioned method.

The frequency of the satellite signal is 50 Hz and the frequency of carrier waves including the satellite signals is 1.5 GHz. The GPS receiver converts the carrier waves into intermediate frequency signals and then demodulates the intermediate frequency signals. The GPS receiver performs the correlation integration of the demodulated signal and the replica PN code sequence having an estimated delay value to detect the positions of the satellites.

Figure 2A:
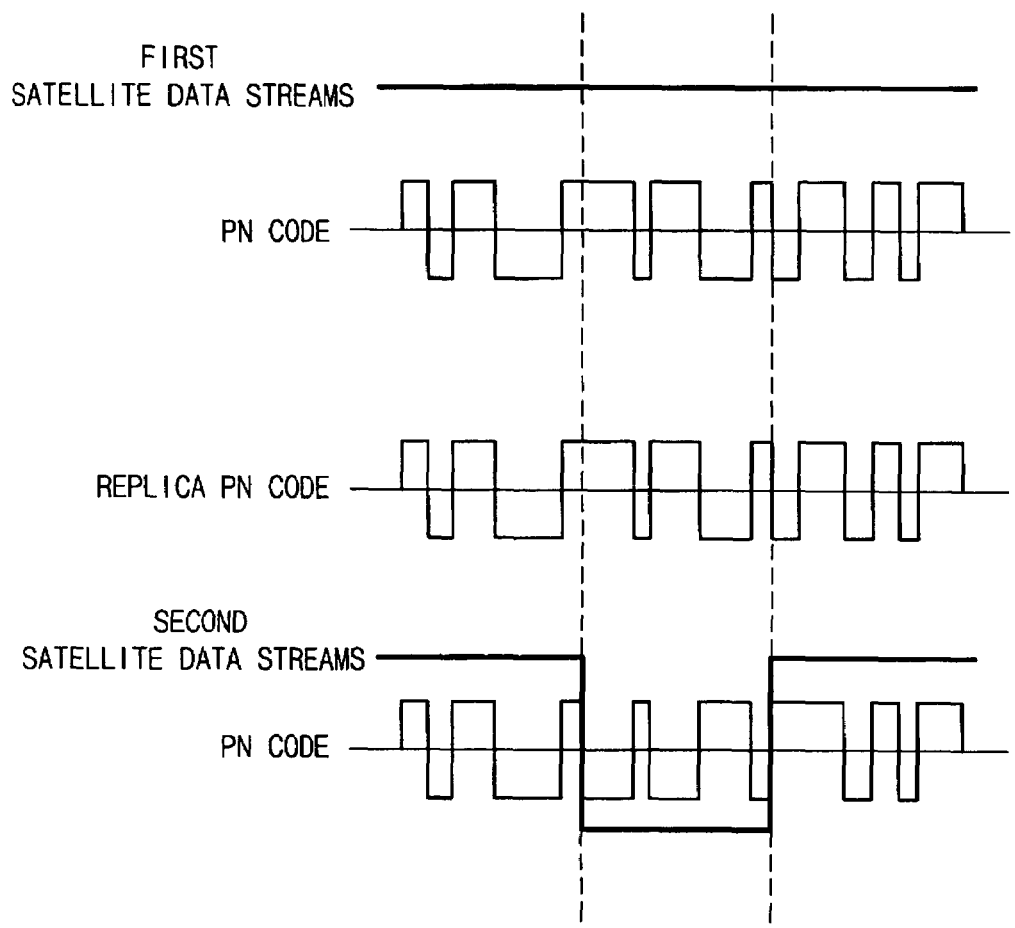
FIG. 2A is a schematic diagram showing satellite data streams and a replica PN code.

FIG. 2A is a schematic diagram showing satellite data streams and a replica PN code.

Referring to FIG. 2A, the replica PN code represents a code having an estimated delay value for detecting the position of the desired satellite. The satellite data streams generally include data-bit boundaries. A data-bit boundary represents a boundary that data changes from 1 to 0 or from 0 to 1. Hereinafter, the data "1" corresponds to a coordinate value "1" and the data "0" corresponds to a coordinate value "−1".

The satellite signal includes the satellite data stream and a PN code sequence corresponding to the satellite. The satellite data stream and the PN code sequence are represented in the form of a product. Hereinafter, the product of the satellite date stream and the PN code will be referred to as satellite pulse train.

Where a satellite data stream does not include the data-bit boundary, the PN code sequence is substantially identical to the replica PN code sequence. (see, e.g., the PN code of the First Data Stream of FIG. 2A) Therefore, the GPS receiver compares the satellite pulse train and the replica PN code sequence to detect navigational data for determining the position of the satellite.

But, the satellite data stream includes data-bit boundaries. Therefore, the satellite pulse train is different from the replica PN code (even though the PN code is substantially identical to the replica PN code) at the data-bit boundary. For example, in FIG. 2A, the value of the replica PN code is 1 at the data-bit boundary while the value of the satellite pulse train is 0. As a result, the GPS receiver may decide that the desired satellite signal is not being received even though the desired satellite signal is being received. Therefore, data correction is required at the data-bit boundary. Hereinafter, the data correction will be described in detail later with reference to attached drawings.

Figure 2B:
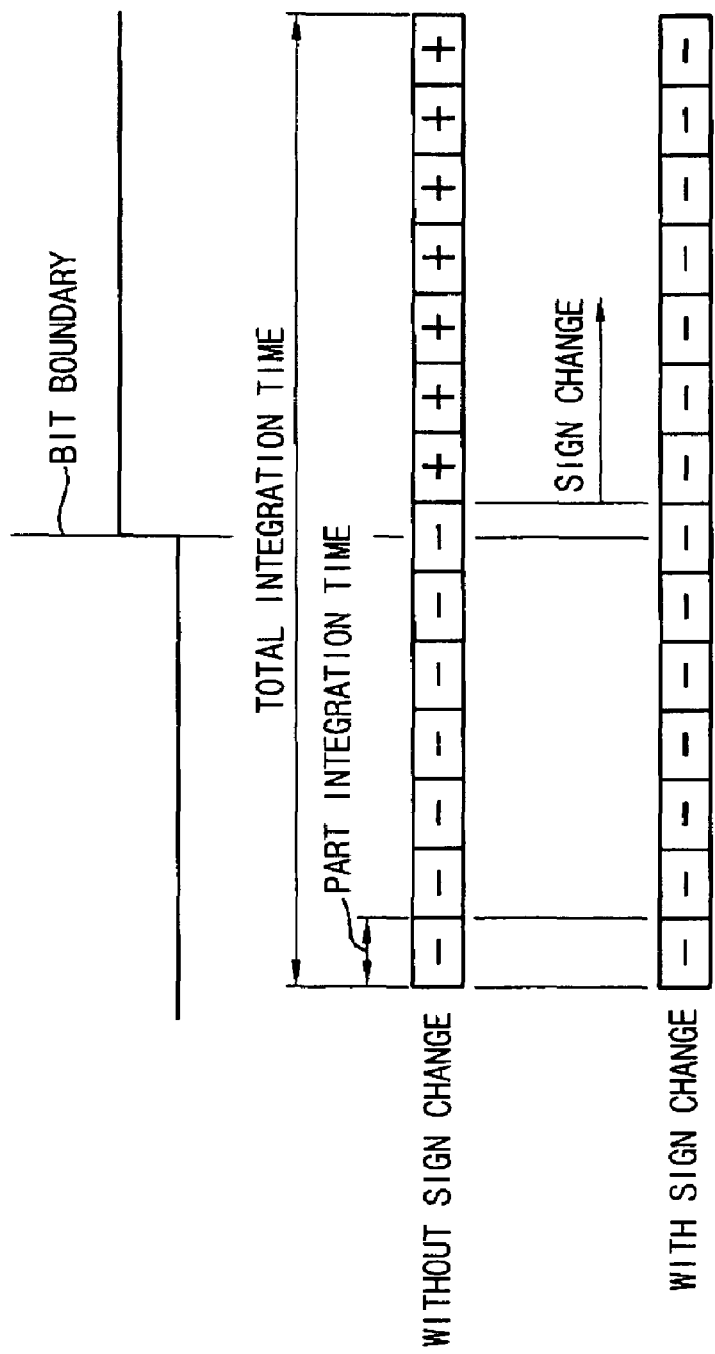
FIG. 2B is a diagram depicting a data-bit boundary in a satellite data stream.

FIG. 2B is a diagram showing a satellite data stream including a data-bit boundary.

Referring to FIG. 2B, the signs of the satellite pulse trains are inverted after the data-bit boundary in case that where satellite data streams include a data-bit boundary.

Figure 3:
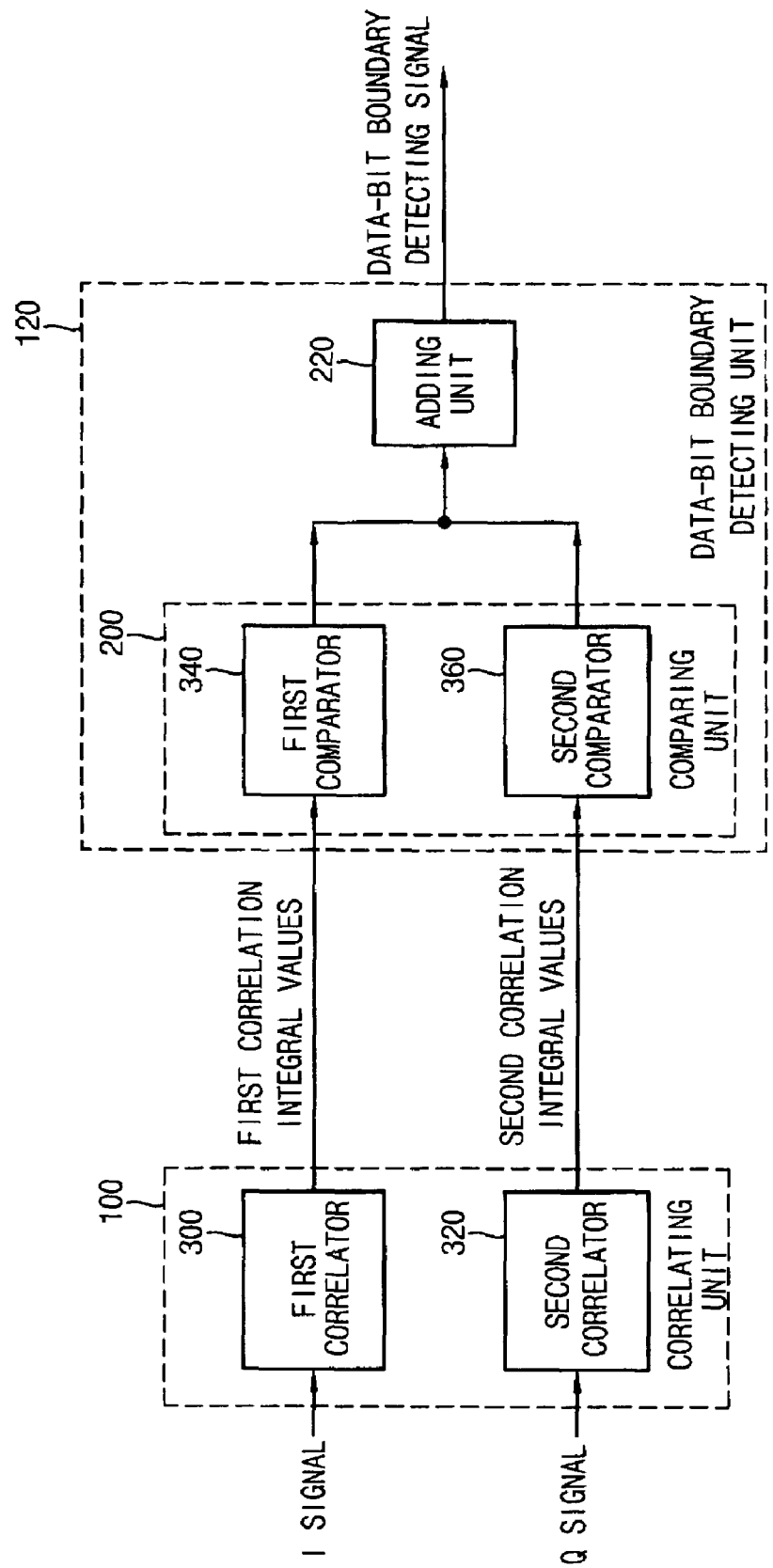
FIG. 3 is a block diagram showing a data-bit boundary detecting apparatus according to an embodiment of the present invention.

FIG. 3 is a block diagram showing a data-bit boundary detecting apparatus according to an exemplary embodiment of the present invention.

Referring to FIG. 3, the data-bit boundary detecting apparatus includes a correlating unit 100 and a data-bit boundary detection unit 120.

The correlating unit 100 includes a first correlator 300 and a second correlator 320.

A GPS receiver according to the present invention may use an omni-directional antenna to receive the right-hand polarized, circular GPS signals. These may be passed through a band-pass filter and low noise amplifier before being down-converted to an intermediate frequency (IF) by a mixer. The GPS receiver may use two down-conversions to reach baseband, where the analog signal is converted into digital in-phase and quadrature (I & Q) channels by multiplication by sine and cosine versions of the local oscillator (mixing) frequency. Some receivers may sample at an intermediate frequency, before down-converting to baseband.

Baseband (downconverted) satellite signals include in-phase (I) signals and quadrature-phase (Q) signals. The in-phase (I) signal has a 90 degree phase difference from the quadrature-phase (Q) signal and the frequency of a received signal is not exactly equal to a predetermined frequency and a predetermined phase corresponding to the satellite, due to the Doppler effect.

The satellite-signal reception discriminating apparatus according to the present invention determines whether the satellite signals were received by using N replica PN codes having different phases from each other. The first correlator 300 calculates the correlation integration for the I signal and the replica PN code sequence, on the basis of a predetermined unit during a predetermined time period, to sequentially output first correlation integral values (I-samples). The correlation integration multiplies (sampled) data included in the I signal by each replica PN code sequence sequentially and sums all multiplied (sampled) values. For example, when the I signal has a data stream of "0, 1, 1, 0, . . . " and the replica PN code sequence has the values of "1, 0, 1, 1, . . . ", a value calculated by the correlation integral is "0×1+1×0+1×1+0× 1+ . . . ". At this time, the first correlator 300 according to the present invention performs the correlation integration for the I signal and the replica PN code sequence on the basis of a predetermined unit, to detect the data-bit boundary. In general, when the satellite pulse train and the replica PN code sequence are correlation integrated, the absolute values of the first correlation integral values will be relatively large because the satellite data stream is substantially identical to the PN code sequence. In the other hand, when the GPS receiver receives an undesired satellite signal, the absolute values of the first correlation integration values will be relatively small. And, when the satellite signal includes the data-bit boundary, the first correlation integral values after the data-bit boundary will have the signs opposite to those of the desired values.

The second correlator 320 calculates the correlation integration for the Q signal and the replica PN code sequence, on the basis of the predetermined unit during the predetermined time period, to sequentially output second correlation integration values (Q-samples). Here, when the satellite signal includes the data-bit boundary, the second correlation integration values after the data-bit boundary will have the signs opposite to those of the desired values.

The data-bit boundary detection unit 120 includes a comparing unit 200 and an adding unit 220.

The comparing unit 200 includes a first comparator 340 and a second comparator 360.

The first comparator 340 compares each sequentially outputted first correlation integral values (I-sample) with an immediately previously outputted first correlation integral (I-sample). For example, the first comparator 340 compares K-th first correlation integral value (I-sample) with K-1-th first correlation integral value (I-sample), where K is an integer equal to or greater than 2. Hereinafter, the correlation integral value is referred to as CI value. When both of the K-th first CI value and the K-1-th first CI value have the same sign, the first comparator 340 changes the sign of the K-th first CI value to positive. But, When the signs of the K-th first CI value and the K-1-th first CI value are different from each other, the first comparator 340 changes only the sign of the K-th first CI value to a negative sign. When the signs of the K-th first CI value and the K-1-th first CI value are different from each other, the data-bit boundary may appear in the data stream corresponding to the K-th first CI value. However, it cannot reliably be concluded that the data-bit boundary appears only by the sign change of the first CI values since the satellite signal has both an I signal and a Q signal.

The negative sign corresponds to the data-bit boundary. Thus, the value of a most significant bit (MSB) is "1". In case of the positive sign, the value of the MSB is "0".

The second comparator 360 compares each of the sequentially outputted second CI values with an immediately previously outputted second CI value. The second comparator 360 changes the signs of the second CI values according to the result of the comparison.

The adding unit 220 adds the changed first CI values (I') and the changed second CI values corresponding to the changed first CI values (Q') to generate data-bit boundary detection signals having information concerning the data-bit boundary. When the sign of the addition value is positive, the output data stream corresponding to the addition value does not have a data-bit boundary. When the sign of the addition value is negative, the output data stream corresponding to the addition value includes a data-bit boundary. This is because the value of the MSB is set to 1 in case that the data-bit boundary appears.

Figure 4:
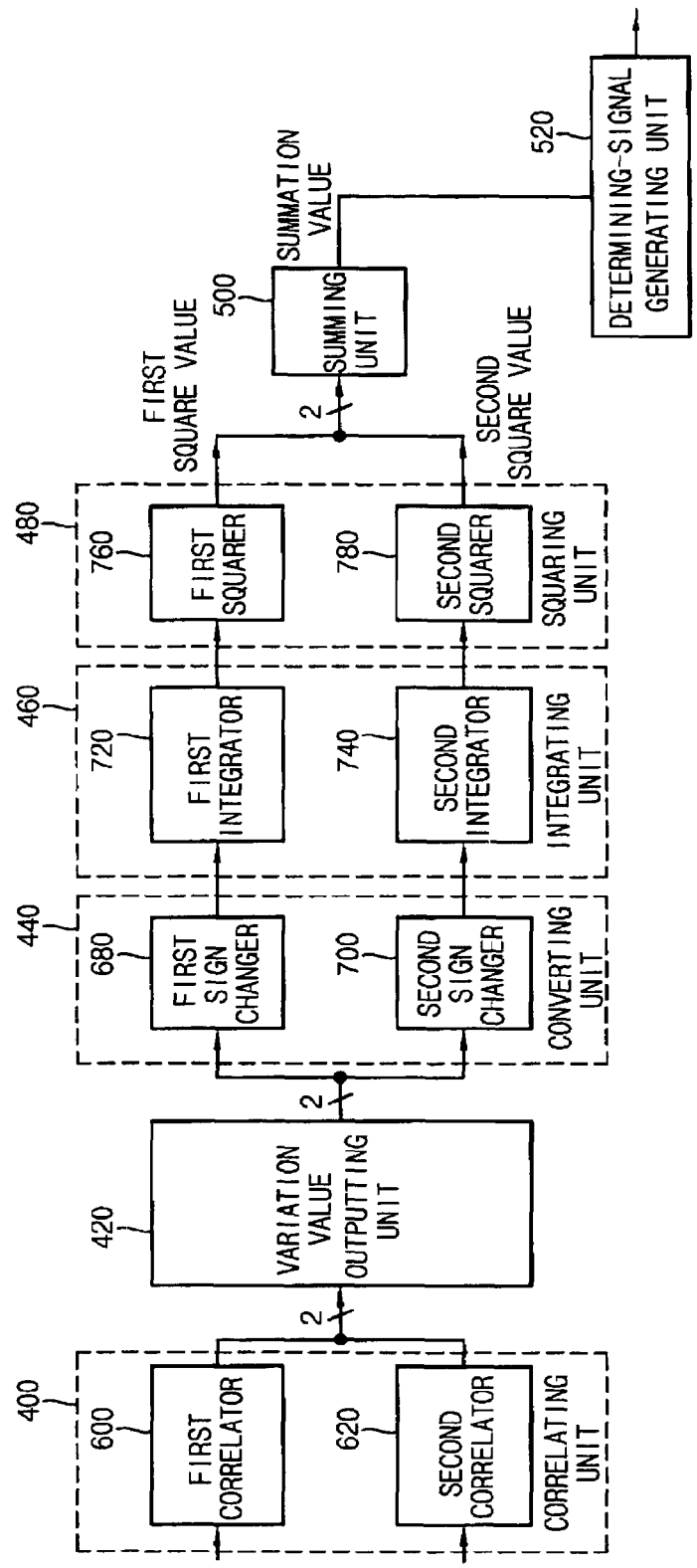
FIG. 4 is a block diagram showing a satellite-signal reception detection apparatus according to an embodiment of the present invention.

FIG. 4 is a block diagram showing a satellite-signal reception discriminating apparatus according to an embodiment of the present invention.

Referring to FIG. 4, the satellite-signal reception discriminating apparatus includes a correlating unit 400, a variation value outputting unit 420, a converting unit 440, an integrating unit 460, a squaring unit 480, a summing unit 500 and a determination-signal generating unit 520.

The correlating unit 400 includes a first correlator 600 and a second correlator 620.

The first correlator 600 calculates the correlation integral of the satellite pulse train and the replica PN code sequence, on the basis of a predetermined unit during a predetermined time period, to sequentially output the first CI values.

The second correlator 600 calculates the correlation integral of the satellite pulse train and the replica PN code sequence, on the basis of a predetermined unit during a predetermined time period, to sequentially output the second CI values.

The variation value outputting unit 420 compares each of the first CI values with an immediately previously outputted first CI value to change the first CI values. And, the variation value outputting unit 420 compares each of the second CI values with an immediately previously outputted second CI value respectively to change the second CI values. The variation value outputting unit 420 adds the changed first CI values to the changed second CI values respectively to output the variation values corresponding to addition values of the changed first CI values and the changed second CI values. The variation value outputting unit 420 outputs "0" as a variation value in case that the sign of such an addition value is positive, and outputs "1" as a variation value in case that the sign of an addition value is negative.

The converting unit 440 includes a first sign changer 680 and a second sign changer 700.

The first sign changer 680 changes the sign of each of the first CI values according to the variation values. If corresponding variation value is "0", the first sign changer 680 does not change the sign of the first CI value. On the other hand, the first sign changer 680 changes the signs of the first CI value corresponding to a variation value having the value of "1" and subsequent first CI values, when the variation value having the value of "1" is outputted for the first time. It is because the data-bit boundary is detected when the variation value becomes 1. Therefore, the satellite pulse train is inverted beginning from the data-bit boundary.

The second sign changer 700 changes the signs of the second CI values according to the variation values. If the corresponding variation value is "0", the second sign changer 700 does not change the sign of a second CI value. On the other hand, the second sign changer 700 changes the signs of the second CI value corresponding to a variation value having the value of "1" and subsequent second CI values, when the variation value having the value of "1" is outputted for the first time.

The integrating unit 460 includes a first integrator 720 and a second integrator 740.

The first integrator 720 integrates the changed first (I) CI values to output first (I) integral values. The second integrator 740 integrates the changed second CI values (Q) to output second (Q) integral values.

The squaring unit 480 includes a first squarer 760 and a second squarer 780. The first squarer 760 squares the first integral values respectively to output first square values. The second squarer 780 squares the second integral values respectively to output second square values.

The summing unit 500 sums the sequence of first square values and the corresponding sequence second square values respectively to output a sequence of summation values.

The determining-signal generating unit 520 compares the summation value with a predetermined threshold value to generate a reception discriminating signal having information indicating whether the desired satellite signal is being received. The GPS receiver recognizes the reception of the desired satellite signal when the summation value is greater than the predetermined threshold value. But, the GPS receiver recognizes that the appropriate satellite signal has being not received when the summation value is less than the predetermined threshold value. Up to the integral process is the "coherent" process, and the square process is a "noncoherent" process.

Figure 5:
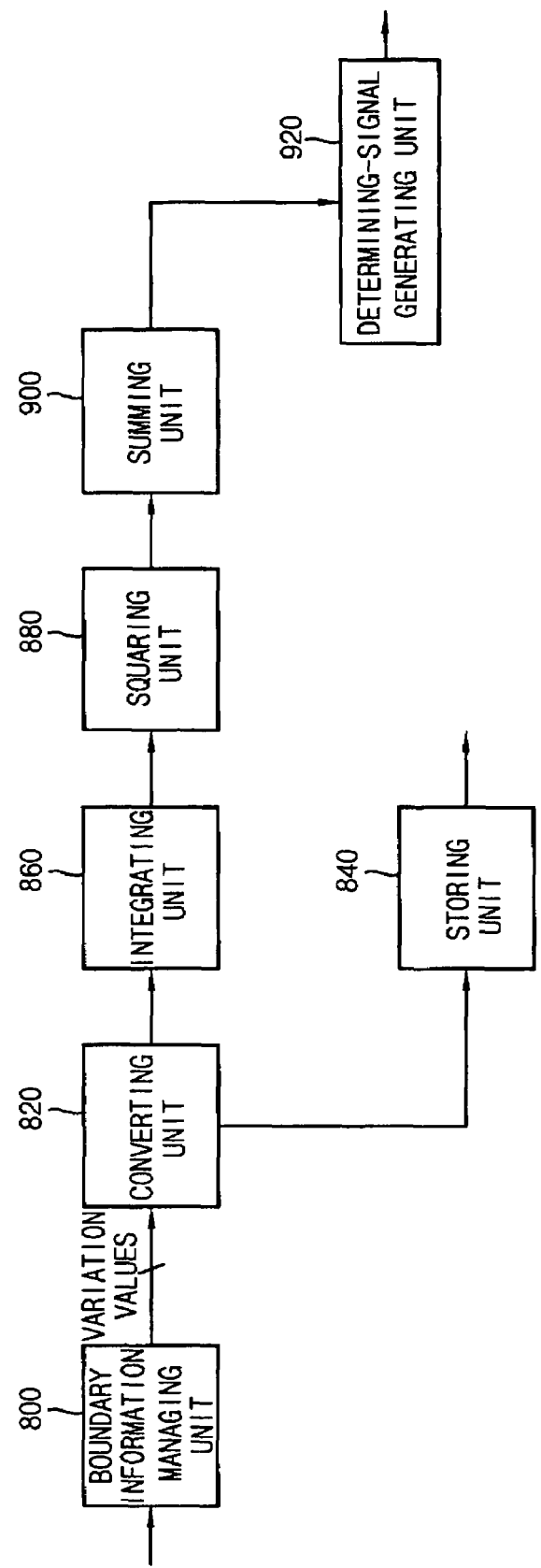
FIG. 5 is a block diagram showing a satellite-signal reception detection apparatus according to another embodiment of the present invention.

FIG. 5 is a block diagram showing a satellite-signal reception discriminating apparatus according to another embodiment of the present invention.

Referring to FIG. 5, the satellite-signal reception discriminating apparatus includes a boundary information managing unit 800, a converting unit 820, a storing unit 840, an integrating unit 860, a squaring unit 880, a summing unit 900 and a determining-signal generating unit 920.

The boundary information managing unit 800 outputs M first CI values, M second CI values and M variation values corresponding to each (one) replica PN code. The boundary information managing unit 800 performs the correlation integral for the satellite pulse train and N of replica PN codes respectively to output N×M (i.e., N by M) of first CI values and N×M of second CI values sequentially, where N is an integer greater than 2. Also, the boundary information managing unit 800 combines the first CI values and the second CI values to output N×M of variation values having a value of 0 or 1.

The converting unit 820 changes the first CI values and the second CI values according to the variation values. Here, the converting unit 820 changes the first CI values and the second CI values by the M values corresponding to each (one) replica PN code.

The storing unit 840 stores the position in the data stream corresponding to the first variation value having a value of "1" among the M values, in a memory. Therefore, the storing unit 840 stores at most N positions of data train in the memory for N of replica PN codes.

The integrating unit 860 outputs N first (I) integral values; by integrating M changed first (I) CI values per each (one) replica PN code. In addition, the integrating unit 860 integrates each set of the M changed second CI values per each (one) replica PN code, to output N second (Q) integral values.

The squaring unit 880 squares each of the first (I) integral values to output N first square values. In addition, the squaring unit 880 squares each of the second (Q) integral values to output N second square values.

The summing unit 900 sums respectively the N first (I) square values and the corresponding N second (Q) square values to output N summation values. Then, the summing unit 900 compares each of the summation values with a predetermined threshold value.

The determining-signal generating unit 920 detects the maximum summation value among the N summation values that are greater than the predetermined threshold value, to generate a reception discriminating signal having information indicating whether the desired satellite signal is being received.

FIG. 6A is a diagram showing a combination table of satellite data stream contained in undesired satellite signals and the replica PN code.

Referring to FIG. 6A, absolute values of the first CI values and the second CI values corresponding to the undesired satellite signals are less than absolute values of them corresponding to the desired satellite signals (see FIG. 6B). In addition, many variation values have the value of "1". Therefore, the summation value of the first square value and the second square value is less than the predetermined threshold value. As a result, the GPS receiver according to the present invention can recognize that the received signal is not the desired satellite signal.

FIG. 6B is a diagram showing a combination table of satellite data stream contained in appropriate satellite signals and the replica PN code.

Referring to FIG. 6B, absolute values of the first CI values and the second CI values corresponding to the desired satellite signals are greater than absolute values of them corresponding to undesired satellite signals (see FIG. 6A). In addition, only one variation value has the value of "1". In general, all the variation values have the value of "0" when the satellite data stream does not include the data-bit boundary. Also, only one of the variation values has the value of "1" when the satellite data stream includes a data-bit boundary. Thus, the satellite-signal reception discriminating apparatus is set to detect one data-bit boundary within a predetermined time period. The variation value having the value of "1" and the subsequent variation values are sample values having a bit (sign) inversion effect. As shown in FIG. 6B, the signs of the first CI values and the second CI values after the variation value having the value of "1" are inverted to compensate for the bit inversion effect due to the bit boundary. As a result, the summation value of the first square value and the second value becomes larger than the predetermined threshold value. Therefore, the GPS receiver can detect that the desired satellite signal is being received.

The exemplary satellite-signal reception discriminating apparatus according to another embodiment of the present invention detects whether or not the satellite signals are being received, by selecting 16 samples because the 16 CI values are conveniently supplied for 16 Fast Fourier Transform (16-FFT).

Figure 7A:
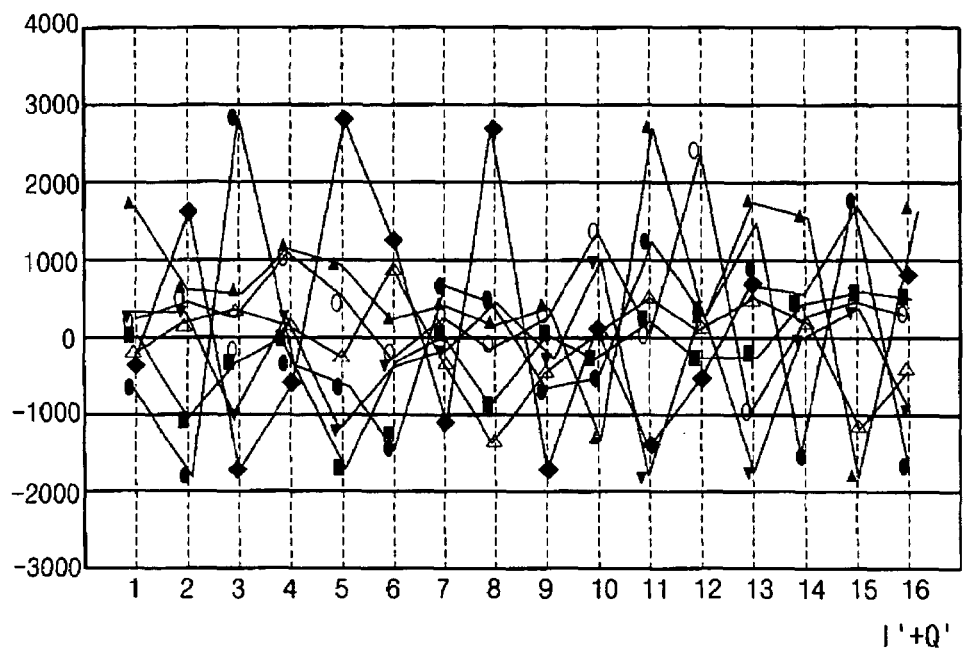
FIG. 7A is a diagram showing summation of "I" values and "Q" values when a GPS receiver receives the undesired satellite signal.
Figure 7B:
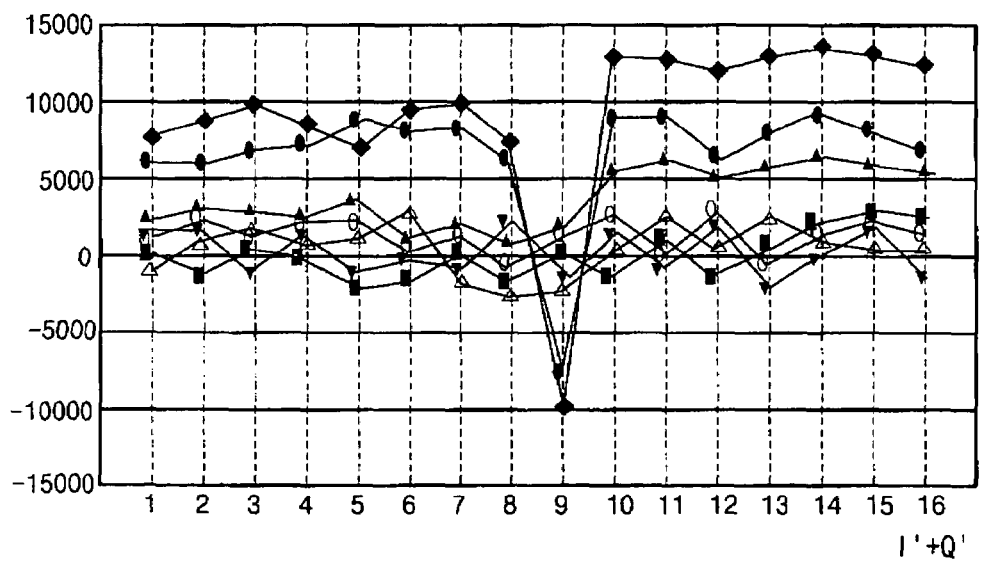
FIG. 7B is a diagram showing summation of the "I" values and the "Q" values when the GPS receiver receives the desired satellite signal.

FIG. 7A is a diagram showing summation of the "I" values and the "Q" values when the GPS receiver receives the undesired satellite signal, and FIG. 7B is a diagram showing summation of the "I" values and the "Q" values when the GPS receiver receives the desired satellite signal.

Referring to FIG. 7A to 7B, the absolute value of the summation of the "I" values and the "Q" values when the GPS receiver receives the undesired satellite signal is less than the absolute value of the summation of the I' values and the Q' values when the GPS receiver receives the desired satellite signal. The satellite data streams shown in FIG. 7B include a data-bit boundary (at 9). Therefore, the signs of the 9th CI value corresponding to the data-bit boundary and the subsequent CI values are inverted.

Figure 8:
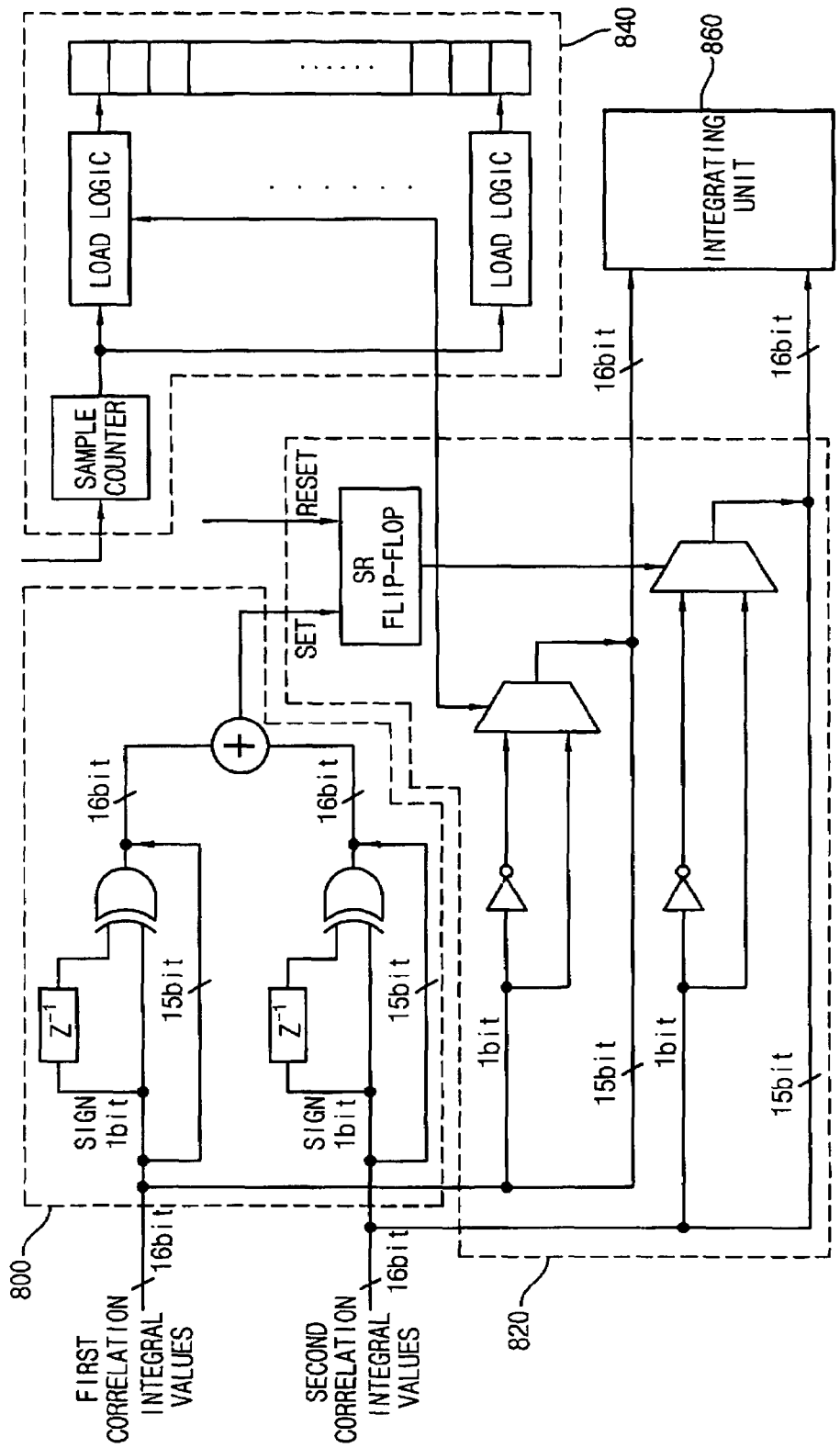
FIG. 8 is a circuit diagram showing the satellite-signal reception detection apparatus of FIG. 5.

FIG. 8 is a detailed circuit diagram showing the satellite-signal reception discriminating apparatus of FIG. 5.

Referring to FIG. 8, a boundary information managing unit 800 includes a first (I) delay element ($z^{-1}$), a first (I) XOR gate, a second (Q) delay element ($z^{-1}$), a second (Q) XOR gate and an adder (+).

The CI values are 16 bit size. Each of the CI values includes a most significant bit MSB (1 bit) which is handled differently than the other 15 bits of each CI value.

The first (I) delay element receives sequentially the first (I) CI values. The first (I) XOR gate is coupled to the output of the first (I) delay element and receives the MSBs of first (I) CI values. Specifically, the first (I) XOR gate performs an XOR operation on a MSB of a currently supplied first (I) CI value and on a MSB of an immediately previously supplied first (I) CI value. As a result, the first (I) XOR gate outputs a sign of the "I" value.

The second (Q) delay element receives sequentially the second (Q) CI values. The second (Q) XOR gate is coupled to the output of the second (Q) delay element and receives the MSBs of second (Q) CI values. Specifically, the second (Q) XOR gate performs an XOR operation on a MSB of a currently supplied second (Q) CI value and on a MSB of an immediately previously supplied second (Q) CI value. As a result, the second XOR gate outputs a sign of the "Q" value.

The adder is coupled to both the output terminal of the first (I) XOR gate and the output terminal of the second XOR gate. As a result, the adder outputs a variation value corresponding to addition value of the sign of the "I" value plus the sign of the "Q" value.

The converting unit 820 includes a first (I) inverter, a first (I) multiplexer, a second (Q) inverter, a second (Q) multiplexer and an SR flip-flop.

The SR flip-flop is operatively coupled to and Set by the output of the adder (+) and receives an externally supplied reset signal. When the variation value output by the adder (+) is "0", the SR flip-flop is not activated (set). On the other hand, when the variation value output by the adder (+) having a value of "1" is received for the first time, the SR flip-flop is activated (Set) and maintains the activated state until the external reset signal is received.

The first (I) inverter inverts the MSB of the first (I) CI values received sequentially. Thus, the first inverter changes the MSB (sign) values of the first (I) CI values (e.g., from "0" to "1").

The first (I) multiplexer is coupled to both the output terminal of the first (I) inverter and is controlled by the output of the SR flip-flop. The first multiplexer receives (and selects one of) the inverted MSB of the first (I) CI values and non-inverted MSB of the first (I) CI values. Specifically, when the SR flip-flop is activated, the first (I) multiplexer outputs the inverted MSB of (I) CI values until the SR flip-flop receives the reset signal. Also, the first (I) multiplexer outputs the (non-inverted) MSB of first (I) CI values when the SR flip-flop is not activated.

The second (Q) inverter inverts the MSB of second (Q) CI values received sequentially. Thus, the second inverter changes the MSB (sign) values of the second (Q) CI values (e.g., from "0" to "1").

The second (Q) multiplexer is controlled by the output of the SR flip-flop. In addition, the second (Q) multiplexer receives the inverted MSB of second (Q) CI values (being coupled to the output terminal of the second inverter) and the non-inverted MSB of second (Q) CI values. Specifically, when the SR flip-flop is activated (Set), the second (Q) multiplexer outputs the inverted MSB of (Q) CI values until the SR flip-flop receives the reset signal. Also, the second (Q) multiplexer outputs the non-inverted MSB of second (Q) CI values when the SR flip-flop receives a variation value having a value of "0".

The storing unit 840 includes a sample counter, a plurality (e.g., N) of load logics and a memory.

The sample counter counts the number of the first (I) CI values, or of the second (Q) CI values, sequentially supplied, and functions as an index to the plurality of load logics and the memory.

The plurality of load logics are operatively coupled to the indexing output of the sample counter. When a variation value having the value of "1" is first detected, the load logic stores location information of the load logic having variation value "1" in the memory. The number of the load logics is same as the number N of the replica PN codes because the satellite-signal reception discriminating apparatus according to the present invention determines whether the satellite signals were received by using the N replica PN codes having different phases from each other. Thus, the N load logics stores in the memory the location information of N variation values having a value of "1" corresponding to the N replica PN codes. Then, the satellite-signal reception discriminating apparatus outputs the phase (location) of the one replica PN code that corresponds to a maximum summation value.

Figure 9:
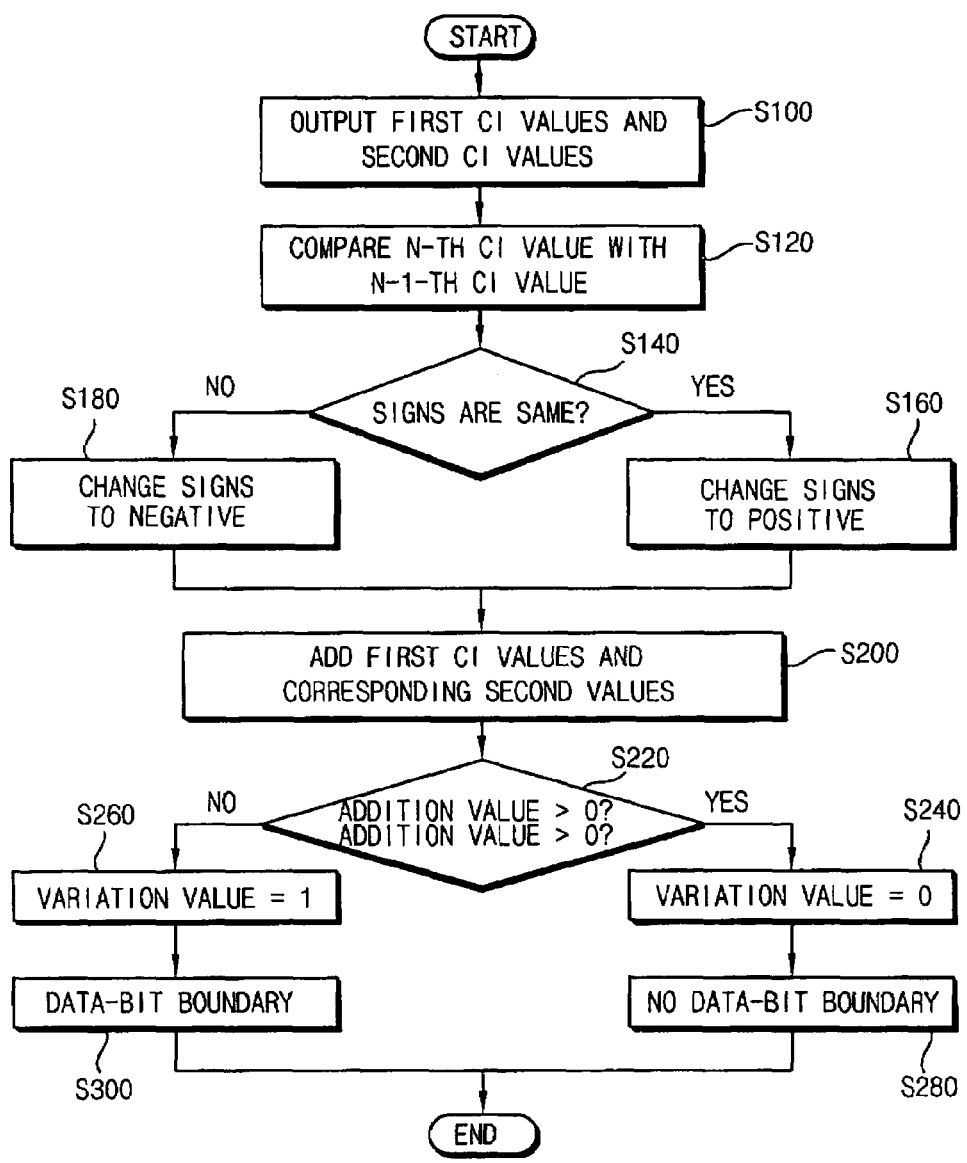
FIG. 9 is a flow chart illustrating the data-bit detecting operation methodology according to an embodiment of the present invention.

FIG. 9 is a flow chart showing the data-bit (boundary) detecting operation methodology according to an exemplary embodiment of the present invention.

Referring to FIG. 9, the correlating unit 100 outputs the first ("I) CI values and the second (Q) CI values (step S100).

Next, the comparing unit 200 compares the K-th first (I) CI value with K-1-th first ("I) CI value, and compares the K-th second (Q) CI value with K-1-th second (Q) CI value (step S120).

In step S140, it is determined whether the respective signs of the K-th first (I) CI value and the K-1-th first (I) CI value are the same as each other; and whether the signs of the K-th second (Q) CI value and the K-1-th second (Q) CI value are the same as each other When the signs (e.g., of the K-th first (I) CI value and the K-1-th first (I) CI value) are the same, the signs (e.g., MSB) of the first CI values and of the second CI values are changed to positive (step S160). Their absolute values are not changed.

When the signs (e.g., of the K-th first (I) CI value and the K-1-th first (I) CI value) are not the same, the signs (e.g., MSB) of the first CI values and the second CI values are changed to negative (step S180). Their absolute values are not changed.

The adding unit 220 sequentially adds together each of the N changed first CI value with the corresponding one of the N changed second value, respectively (step S200), to output N addition values.

Whether each addition value is greater than 0 is determined in step S220.

When an addition value is greater than 0, the variation value is set as "0" (step S240), And, there is no data-bit boundary detected when the variation value equals "0" (step S280).

When an addition value is less than "0", the variation value is set as "1" (step S260), and there is a data-bit boundary candidate detected when the variation value equals to "1" (step S300).

The data-bit (boundary) detecting operation methodology of FIG. 9 is repeated (from start) N times for each received CI value.

Figure 10:
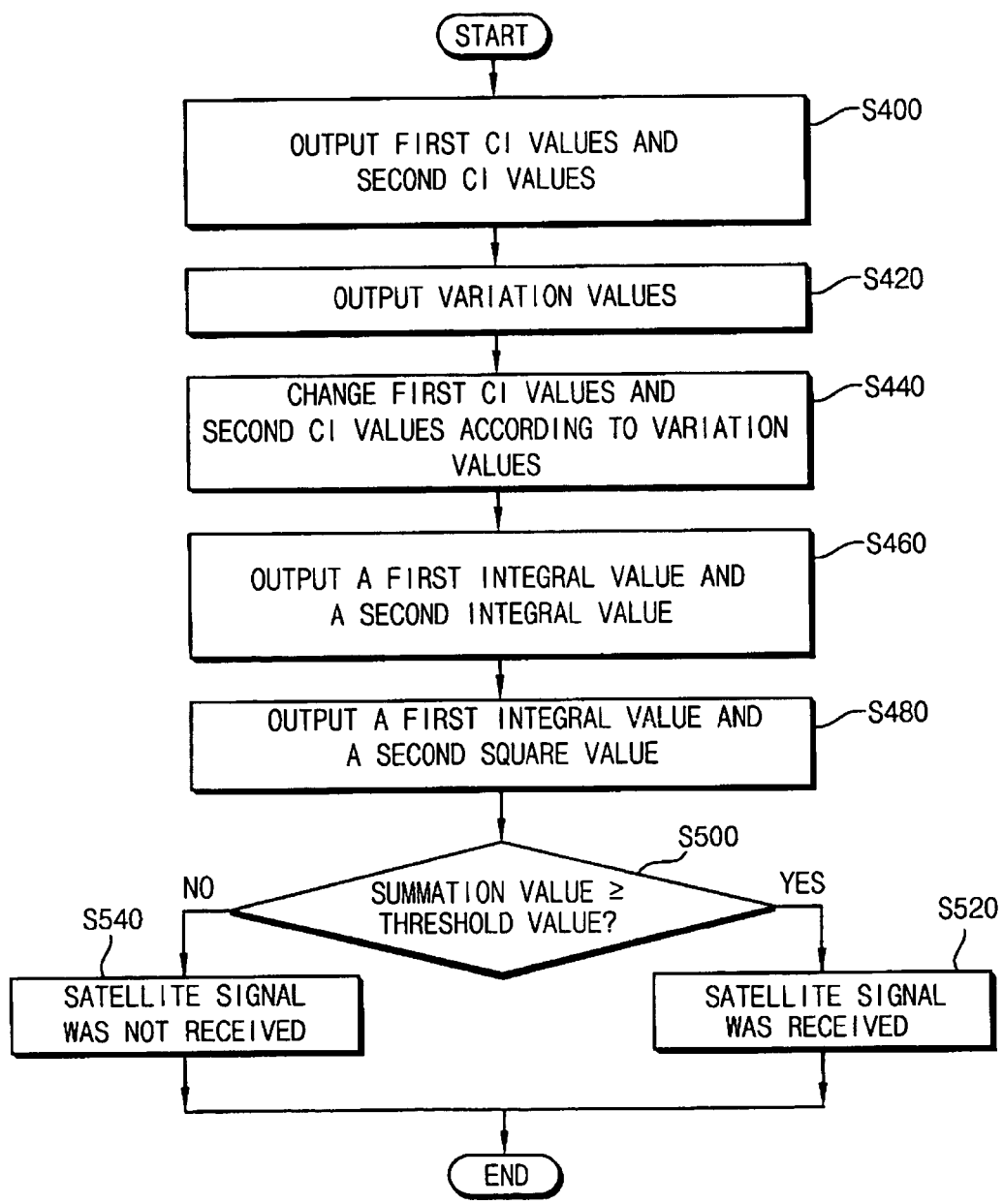
FIG. 10 is a flow chart illustrating the satellite-signal reception detection operation methodology according to an embodiment of the present invention.

FIG. 10 is a flow diagram showing the satellite-signal reception discriminating operation methodology according to an exemplary embodiment of the present invention.

Referring to FIG. 10, the correlating unit 400 sequentially performs correlation integrals for the satellite data stream and the replica PN code sequence, to output the first CI values and the second CI values (step S400).

The variation value outputting unit 420 combines the first CI values and the second CI values to output the variation values (step S420).

The converting unit 440 changes the first CI values and the second CI values according to the variation values (step S440).

The integrating unit 460 integrates the changed first CI values and the changed second CI values respectively, to output the first integral value and the second integral value (step S460).

The squaring unit 480 computes the squares of the first integral value and the second integral value respectively to output the first square value and the second square value (step S480).

The determining-signal generating unit 520 determines whether the summation value of the first square value and the second square value is greater than the predetermined threshold value (step S500).

When the summation value is grater than the predetermined threshold value, the satellite-signal reception discriminating apparatus recognizes that a desired satellite signal is received (step S520).

But, when all of the summation values associated with N phases of the replica PN codes are less than the predetermined threshold value, the satellite-signal reception discriminating apparatus recognizes that desired satellite signal was not received (step S540).

Figure 11:
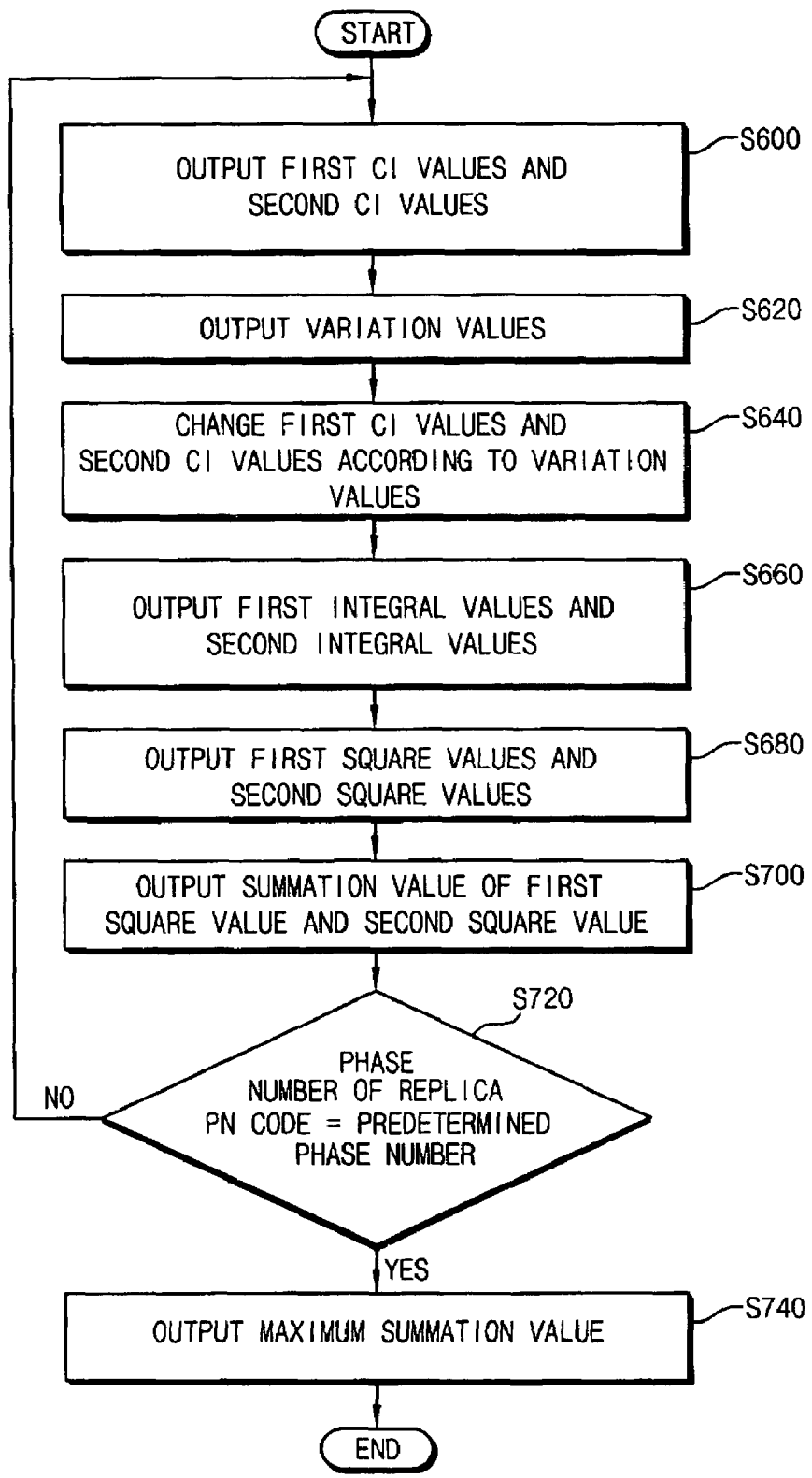
FIG. 11 is a flow chart illustrating the satellite-signal reception detection operation methodology according to another embodiment of the present invention.

FIG. 11 is a flow chart showing the satellite-signal reception discriminating operation methodology according to another exemplary embodiment of the present invention.

Referring to FIG. 11, the boundary information managing unit 800 performs the correlation integral for the satellite data stream and the replica PN code sequence, to output the first CI values and the second CI values (step S600).

The boundary information managing unit 800 combines the first CI values and the second CI values to output the variation values (step S620).

The converting unit 820 changes the first CI values and the second CI values according to the variation values (step S640).

The integrating unit 860 integrates the changed first CI values and the changed second CI values to output the first integral value and the second integral value respectively (step S660).

The squaring unit 880 computes the square of the first integral value and of the second integral value, to output the first square value and the second value respectively (step S680).

The summing unit 900 sums the first square value and the second square value, to output the summation value (step S700).

Whether the number (K) of the phase of the replica PN code is equal toga predetermined number (N) of the phases is determined (step S720).

When the number (K) of the phase of the replica PN code is less than the predetermined number (N) of phases, the phase of the replica PN code is changed (incremented), so that the aforementioned process may be performed again from the step S600.

When the number (K) of the phase of the replica PN code is equal to the predetermined number (N) of phases, the determining-signal generating unit 920 compares the summation values to output the maximum summation value (step S740).

Figure 12:
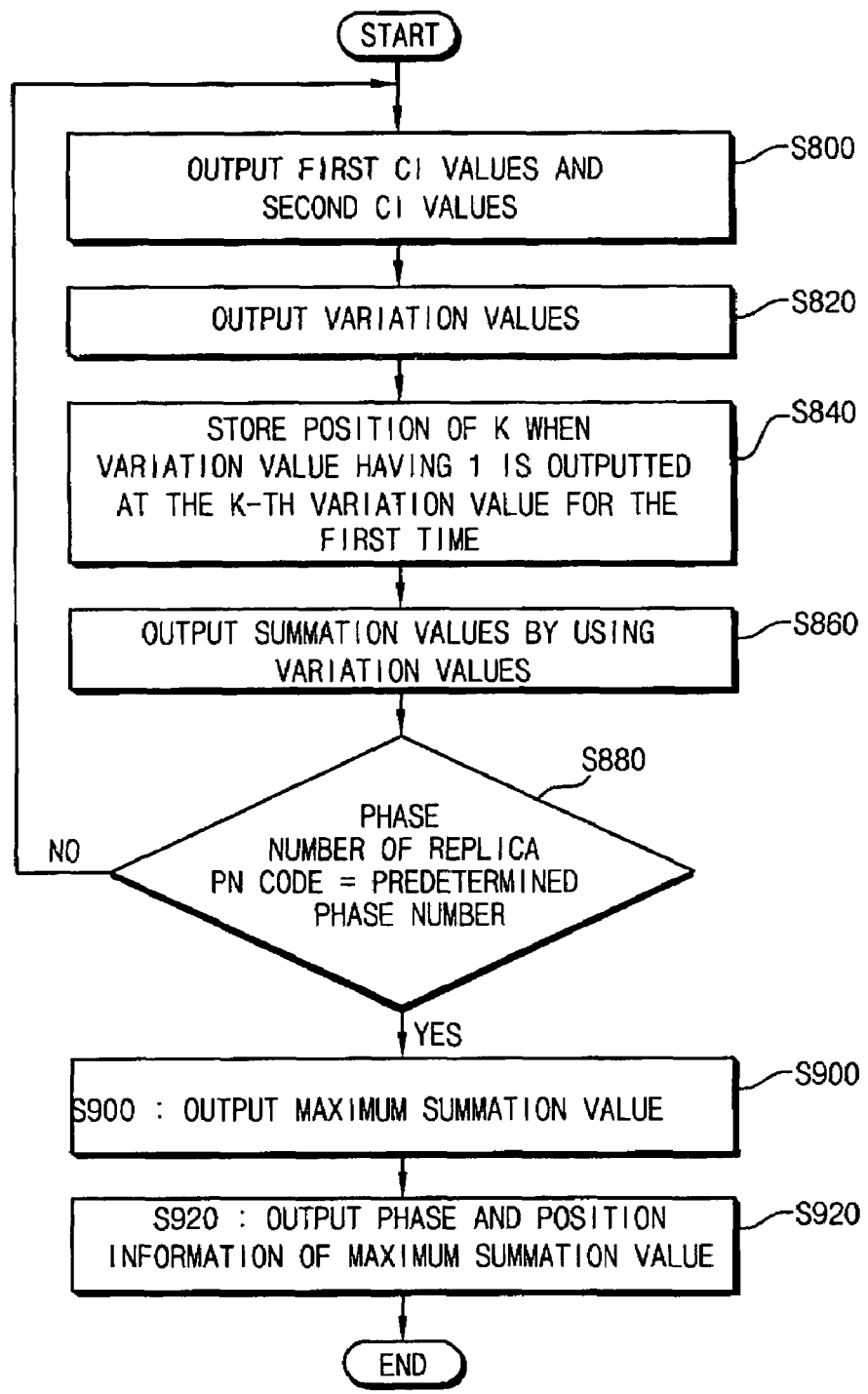
FIG. 12 is a flow chart illustrating the satellite-signal reception detection operation methodology according to still another embodiment of the present invention.

FIG. 12 is a flow chart showing the satellite-signal reception discriminating operation methodology according to still another exemplary embodiment of the present invention.

Referring to FIG. 12, the boundary information managing unit 800 performs the correlation integral for the satellite pulse trains and the replica PN code, to output the first (I) CI values and the second (Q) CI values (step S800).

The boundary information managing unit 800 combines the first CI values and the second CI values to output the variation values (step S820).

The storing unit 840 stores the K-th position in the memory when the variation value having the value of "1" is first outputted, at the K-th position (step S840).

The summing unit 900 outputs the summation value based on the variation values (step S860).

Whether or not the number K of the phase of the replica PN code is equal to a predetermined number N of phase is determined (step S880). Where the number (K) of the phase of the replica PN code is less than the predetermined number (N) of phases, the phase of the replica PN code is changed (incremented), so that the aforementioned process may be performed again (for all of N phases of the replica PN code) from the step S800.

And, where the number (K) of the phase of the replica PN code is equal to the predetermined number (N) of phases, the determining-signal generating unit 920 compares the summation values to output the maximum summation value (step S900).

And then, the information of the phase and the position corresponding to the maximum summation value are outputted (step S920) As described above, the method and the apparatus for detecting data-bit boundary according to the present invention may detect the data-bit boundary because it outputs the variation values by using partial CI values and changes the CI values according to the variation values.

Further, the method and the apparatus for detecting satellite-signal reception according to the present invention may discriminate correctly whether the desired satellite signal is received where the satellite data stream includes a data-bit boundary, because the data-bit boundary itself can be detected.

It will be apparent to those of skill in the appertaining arts that various modifications can be made within the scope of the above disclosed invention. Accordingly, this invention is not to be considered limited to the specific examples or embodiments chosen for the purposes of disclosure, but rather to cover all changes and modifications which do not constitute departures from the permissible scope of the present invention as defined in the following claims. In the following claims, wherein N, and M, and N×M, are integers greater than 2, and K is an integer variable that varies from 1 to M.

What is claimed:

1. A method for detecting a data-bit boundary in a satellite data stream in a pulse train of a global positioning satellite (GPS) signal, the pulse train being a product of the satellite data stream and a Pseudo-Noise (PN) code sequence, comprising:

(a) calculating a correlation integral between the pulse train and a replica Pseudo-Noise (RPN) code to sequentially output M first correlation integral values and M second correlation integral values;
(b) comparing the K-th first correlation integral value with the K-1-th first correlation integral value, to change the K-th first correlation integral value;
(c) comparing the K-th second correlation integral value with the K-1-th second correlation integer value to change the K-th second correlation integer value;
(d) calculating the sum of the changed K-th first correlation integral value and the changed K-th second correlation integral value;
(e) generating a K-th variation value according to the calculated sum;
repeating steps (b) through (e) while K is sequentially incremented from 2 to M; and
detecting a data-bit boundary based on the variation values.

2. The method of claim 1, wherein the K-th variation value is 0 when the sum of the K-th first correlation integral value and the K-th second correlation integral value is a positive number.

3. The method of claim 1, wherein the K-th variation value is 1 when the sum of the K-th first correlation integral value and the K-th second correlation integral value is a negative number.

4. A data-bit boundary detecting method comprising:
(a) calculating a correlation integral between a satellite pulse train and a replica PN code to sequentially output M first correlation integral values and M second correlation integral values, the satellite pulse train contained in a satellite signal being a product of a satellite data stream and a Pseudo-Noise (PN) code sequence;
(b) comparing the K-th first correlation integral value with the K-1-th first correlation integral value to change the K-th first correlation integral value;
(c) comparing the K-th second correlation integer value with the K-1-th second correlation integral value to change the K-th second correlation integral value;
(d) calculating the sum of the changed K-th first correlation integral value and the changed K-th second correlation integral value;
(e) generating a K-th variation value according to the calculated sum;
(f) repeating steps (b) through (e) while K is sequentially incremented from 2 to M;
(g) changing the M first correlation integral values and the M second correlation integral values according to the generated variation values;
(h) combining the changed M first correlation integral values and the changed M second correlation integral values to output a M combination value; and
(i) comparing the combination value with a predetermined threshold value.

5. The method of claim 4, further comprising:
outputting a reception discriminating signal having information indicating whether or nor a desired satellite signal is received.

6. The method of claim 4, wherein changing the M first correlation integral values and changing the M second correlation integral values includes changing the sign bit of each of the M first correlation integral values and changing the sign bit of each of the M second correlation integral values, respectively.

7. The method of claim 4, wherein the step (h) comprises:
integrating the changed M first correlation integral values to output a first integral value;
integrating the changed M second correlation integral values to output a second integral value;
squaring the M first integral value to output a first square value;
squaring the M second integral value to output a second square value; and
summing the first square value and the second square value to output the combination value.

8. The method of 4, wherein the step (g) comprises:
changing the K-th first correlation integral value and subsequent first correlation integral values, and changing the K-th second correlation integral value and subsequent second correlation integral values, when the K-th variation value has a value of 1.

9. The method of claim 6, further comprising (j) storing a location information corresponding to K.

10. The method of claim 9, further comprising:
changing the phase of the replica PN code; and
repeating steps (a) through (j) in accordance with the changed phase.

11. The method of claim 10, further comprising:
comparing the combination values respectively associated with phases of the replica PN code;
extracting a maximum combination value among the combination values; and
outputting a phase corresponding to the maximum combination value.

12. An apparatus for detecting a data-bit boundary in a satellite data stream in a pulse train being a product of the satellite data stream and a Pseudo-Noise (PN) code sequence, comprising:
a correlating unit configured to calculate a correlation integral between a satellite pulse train and a replica PN code sequence to sequentially output M first correlation integral values and M second correlation integral values; and
a data-bit boundary detecting unit configured to compare each of the M sequentially outputted first correlation integral values with an immediately previously outputted first correlation integral value, and configured to compare the M sequentially outputted second correlation integral values with an immediately previously outputted second correlation integral value;
wherein the data-bit boundary detection unit configured to change each of the M first correlation integral values and to change each of the M second correlation integral values respectively, and configured to sequentially add the changed M first correlation integral values and the changed M second correlation integral values respectively, to generate M data-bit boundary detection signals having information corresponding to the data-bit boundary.

13. The apparatus of claim 12, wherein the apparatus is adapted to change the sign of each of the M first correlation integral values based on the comparison of the M sequentially outputted first correlation integral values with an immediately previously outputted first correlation integral value; and
further adapted to change the sign of each of the M second correlation integral values based on the comparison of the M sequentially outputted second correlation integral values with an immediately previously outputted second correlation integral value.

14. An apparatus for detecting a data-bit boundary in a satellite data stream in a pulse train being a product of the satellite data stream and a Pseudo-Noise (PN) code sequence, comprising:
a correlating unit configured to calculate a correlation integral between a satellite pulse train and a replica PN code sequence to sequentially output M first correlation integral values and M second correlation integral values; and a data-bit boundary detecting unit configured to compare each of the M sequentially outputted first correlation integral values with an immediately previously outputted first correlation integral value, and configured to compare the M sequentially outputted second correlation integral values with an immediately previously outputted second correlation integral value;

wherein the data-bit boundary detecting unit comprises:

a comparing unit configured to compare each of the M first correlation integral values with an immediately previously outputted first correlation integral value, and configured to compare each of the M second correlation integral values with an immediately previously outputted second correlation integral value;

a converting unit configured to change each of the M first correlation integral values and each of the M second correlation integral values, based on the comparison result in the comparing unit; and an adding unit configured to sum the each of the changed M first correlation integral values and respective ones of the changed M first correlation integral values, to generate M data-bit boundary detection signals.

15. The data-bit boundary detecting apparatus of claim 14, wherein the comparing unit comprises:

a first comparator configured to compare each of the M first correlation integral values with an immediately previously outputted first correlation integral value; and a second comparator configured to compare each of the M second correlation integral values with an immediately previously outputted second correlation integral value.

16. The data-bit boundary detecting apparatus of claim 15, wherein the converting unit comprises:

a first converter configured to change the sign of each of M first correlation integral values according to the comparisons by the first comparator; and a second converter configured to change the sign of each of the M second correlation integral values according to the comparisons by the second comparator.

17. A satellite-signal reception detection apparatus comprising:

a correlating unit configured to calculate a correlation integral between a satellite pulse train and a replica PN code sequence to sequentially output M first correlation integral values and M second correlation integral values, the satellite pulse train being a product of a satellite data stream and a Pseudo-Noise (PN) code sequence;

a variation value outputting unit configured to output M variation values having information about a data-bit boundary based on the M first correlation integral values and the M second correlation integral values;

a converting unit configured to change the sign of each of the M first correlation integral values and to change the sign of each of the M second correlation integral values, according to a corresponding variation value;

a combination value generating unit configured to perform the combination of the M changed first correlation integral values and the M changed first correlation integral values, to output a satellite-signal reception discriminating value; and a determining-signal generating unit configured to compare the satellite-signal reception discriminating value with a predetermined threshold value and to output a reception detection signal having information indicating whether or not the satellite signals are received.

18. The satellite-signal reception detection apparatus of claim 17, wherein the variation value outputting unit comprises:

a comparing unit configured to compare each of the M first correlation integral values with an immediately previously outputted first correlation integral value, and configured to compare each of the M second correlation integral values with an immediately previously outputted second correlation integral value to change M second correlation integral values;

an adding unit configured to sum each of the M first correlation integral values with corresponding ones of the M second correlation integral values respectively, to output M addition values; and a variation value determining unit configured to output M variation values based on the M addition values.

19. The satellite-signal reception detection apparatus of claim 18, wherein the comparing unit comprises:

a first delay element configured to delay the sign-bit of each of the M first correlation integral values by a predetermined amount;

a first XOR gate, coupled to the output of the first delay element, configured to sequentially receive each of the M sign-bits of the first correlation integral values and each of the M sign-bits of the delayed first correlation integral values;

a second delay element configured to delay the sign-bit of each of the M second correlation integral values by a predetermined amount; and a second XOR gate, coupled to the output of the second delay element, configured to sequentially perform a logical XOR operation on each of the M sign-bits of second correlation integral values and each of the M sing-bits of the delayed second correlation integral values.

20. The satellite-signal reception detection apparatus of claim 18, wherein the variation value determining unit comprises:

a flip-flop configured to sequentially receive the M addition values;

a first inverter configured to invert the M sign bits of the first correlation integral values;

a first multiplexer, controlled by the flip-flop, configured to receive and select between the sign bits of each of M first correlation integral values and of each M inverted first correlation integral values;

a second inverter configured to invert the M sign bits of the second correlation integral values; and a second multiplexer, controlled by the flip-flop, configured to receive and select between the sign bits of each of M second correlation integral values and the sign bits of each of M inverted second correlation integral values.

21. The satellite-signal reception detection apparatus of claim 17, wherein the combination value generating unit comprises:

an integrating unit configured to integrate the changed first correlation integral values to output a first integral value and configured to integrate the changed second correlation integral values to output a second integral value;

a multiplying unit configured to square the first integral value to output a first square value and configured to square the second integral value to output a second square value; and a summing unit configured to sequentially sum the first square value with the second square value to output satellite-signal reception discriminating value.

22. The satellite-signal reception discriminating apparatus of claim 17, wherein the converting unit changes signs of a K-th first correlation integral value and of subsequent first correlation integral values, and changes the signs of a K-th second correlation integral value and of subsequent second correlation integral values, when a value of "1" is first detected at a K-th value of the variation values.

23. A satellite-signal reception detection apparatus comprising:
- a boundary information managing unit configured to combine a satellite pulse train and N replica PN code sequences to sequentially output N×M first correlation integral values and N×M second correlation integral values, the satellite pulse train being a product of a satellite data stream and a Pseudo-Noise (PN) Code sequence, and configured to combine the first correlation integral values and the second correlation integral values to output N×M variation values having information about a data-bit boundary;
- a converting unit configured to change the first correlation integral values and the second correlation values according to the variation values;
- an integrating unit configured to integrate the changed first correlation integral values to output N first integral values, and configured to integrate the changed second correlation integral values to output N second integral values;
- a squaring unit configured to square the N first integral values and to output N first square values, and configured to square the N second integral values and to output N second square values respectively;
- a summing unit configured to sequentially sum each of the N first square values with the corresponding ones of the N second square values respectively, to sequentially output N addition values; and
- a determining-signal generating unit configured to compare the N addition values with a predetermined threshold value, to output a reception discriminating signal having an information indicating whether or not the satellite signal is received, and configured to output a phase information corresponding to the greatest addition value greater than the predetermined threshold value.

24. The satellite-signal reception detection apparatus of claim 23, further comprising a storing unit configured to store location information of the variation values having a value of "1".

25. The satellite-signal reception discriminating apparatus of claim 24, wherein the storing unit comprises:
- a counter configured to count the N×M variation values;
- a location information loading unit, coupled to an output of the counter, configured to load the location information of the variation values having the value of "1" and
- a memory configured to store the loaded location information.

* * * * *